Oct. 9, 1951
C. H. HOEPPNER
2,570,236
DISCRIMINATOR CIRCUIT
Filed April 28, 1945
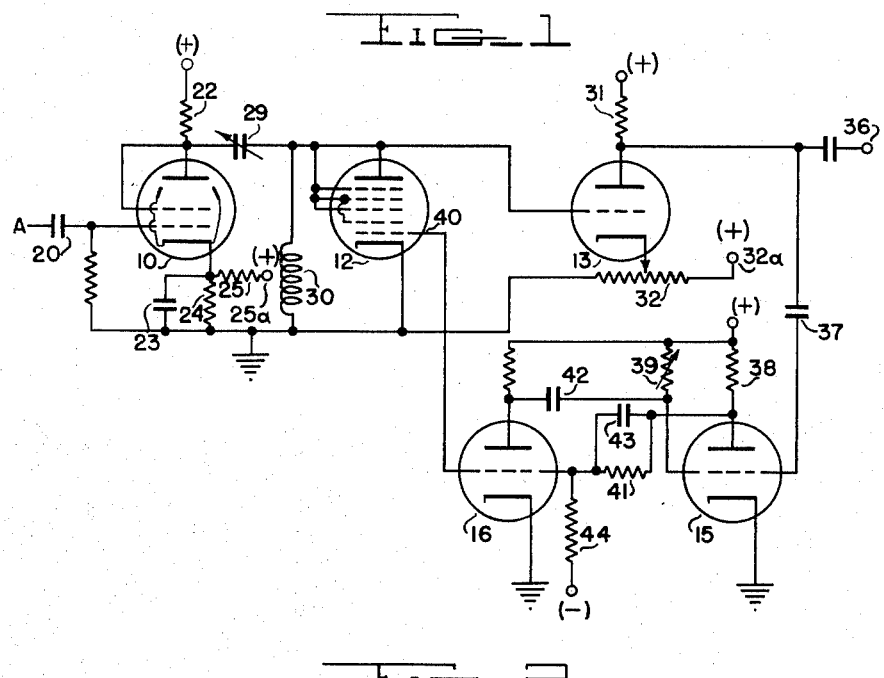
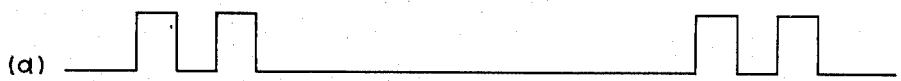
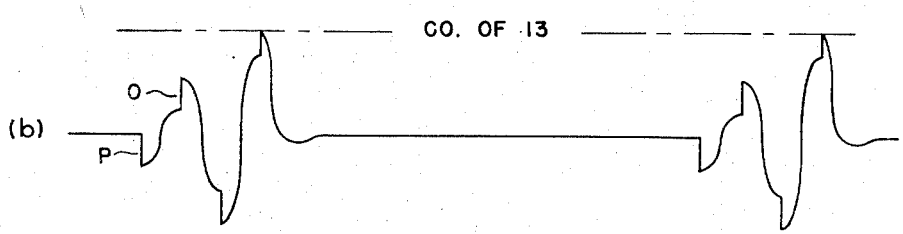
Inventor
CONRAD H. HOEPPNER
By Ralph L. Chappell
Attorney Patented Oct. 9, 1951

2,570,236

UNITED STATES PATENT OFFICE 2,570,236

DISCRIMINATOR CIRCUIT

Conrad H. Hoeppner, Washington, D. C.

Application April 28, 1945, Serial No. 590,863

6 Claims. (Cl. 250—27)

(Granted under the act of March 3, 1883, as amended April 30, 1928; 370 O. G. 757)

This invention relates to an electrical circuit which is held singly responsive to pulse signals having a definite waveform and unresponsive to signals having a different waveform.

In various pulse transmission systems it is frequently desirable to give the system a distinguishing transmission characteristic, for example, one in which the pulse signals have a distinctive pulse formation. By this means several messages can be transmitted on a single carrier frequency, each message being characterized by a definite pulse formation. Also by this means receiving equipment may be provided which is held singly responsive to a pulse transmission having a certain characteristic and unresponsive to other types of pulse signals, and therefore a receiving system which is less susceptible to interfering signals. One of the most flexible types of pulse transmission systems, and the type to which the invention relates, emits signals in the form of a group of pulses. The number of the pulse signals in each group and their time duration and spacing are all of primary significance and require special discriminating means at the receiving system in order to obtain the intelligence of the transmission.

It is an object of this invention to provide an electrical circuit which is discriminatory in its action in that it is held singly responsive to a group of pulse signals having equal time duration and spacing.

It is another object of this invention to provide a discriminator of the foregoing type which employs a pulse-excited oscillatory circuit.

It is another object of the invention to provide a pulse-excited oscillatory circuit whose oscillations build up in amplitude in a manner substantially proportional to the number of applied exciting pulses.

It is another object of this invention to provide an amplitude responsive device operating in conjunction with an oscillatory circuit of the foregoing type for rapidly damping out the oscillations after they have obtained a predetermined amplitude.

Other objects and features of the present invention will become apparent upon a careful consideration of the following detailed description when taken together with the accompanying drawings.

Fig. 1 is a circuit diagram of a typical embodiment of the invention; and

Fig. 2 shows a series of waveforms taken to illustrate the operation of the circuit shown in Fig. 1.

A typical pulse discriminating circuit, which functions according to the teachings of the invention and which is adapted to operate in response to a group of pulse signals having equal time duration and spacing, is shown in Fig. 1. To perform the designed function there is included in the circuit a high "Q" series-connected oscillatory circuit comprising capacitance 29 and inductance 30. This oscillatory circuit is tuned to a frequency whose one-half period is equal to or approximately equal to the time duration of the pulse signal applied to it by the amplifier 10. The latter is biased at a suitable point below cut-off by means of the positive voltage 25a applied to its cathode through the voltage-dividing resistances 24 and 25 and functions primarily as a limiter or shaper tube so that the pulses applied to the oscillatory circuit are of uniform amplitude. Not shown, but connected to the control grid of tube 10 through the capacitance 20, is the output of a detector. The output from the latter is in the form of positive pulses which are of sufficient amplitude to drive tube 10 to heavy conduction. When a positive pulse is applied to the control grid of tube 10, its plate potential will drop due to the IR drop across resistor 22. This sudden drop in potential is communicated directly to the oscillatory circuit which, due to the inductance 30, cannot undergo an abrupt change in current. Thus as the plate voltage of tube 10 drops in response to the positive leading edge of the initial pulse applied to its control grid, the oscillatory circuit is shocked into oscillation. The impedance of the inductance 30 is exceedingly high to the high frequency components of the applied input pulse so that the voltage drop appearing across the plate-load resistance 22 will immediately appear across the inductance 30. The oscillation which results starts in one phase and occurs at the natural frequency of the inductance 30 and the capacitance 29. At the negative trailing edge of the first pulse a second train of oscillations of an opposite phase is excited in the oscillatory circuit. This second train of oscillations will either reinforce or oppose those excited by the leading edge of the pulse depending upon the pulse time duration. Similarly the oscillations started by the leading and trailing edges of all the pulses in the applied group will either reinforce or oppose each other depending upon the time duration and spacing of the pulses in the group. If the time duration and spacing of the pulses are all equal and are equal to or approximately equal to one-half the natural period of the oscillatory circuit, the resulting oscillation will progressively increase in amplitude with each of the applied pulses. Since a series type of oscillatory circuit is used, tube 10 may be a high current type, such as a 6L6, triode connected, to permit maximum transfer of energy to the oscillatory circuit. Another advantage of a series resonant circuit resides in the ability of the circuit to produce oscillations across either reactive element which are of a magnitude greater by a factor of "Q" than those applied to the circuit input. This feature makes it possible to obtain, from either reactive element, oscillations which have a magnitude more nearly proportional to the number of applied pulses or, stating it differently, oscillations which are not limited to the amplitude of the applied pulses. Thus for optimum performance it becomes desirable to maintain the "Q" of the circuit as high as possible by keeping the plate-load resistance 22 as low as possible, say in order of 500 to 1000 ohms.

The output of the oscillatory circuit is taken across the inductance 30 and applied to the grid of an amplitude responsive tube 13. This tube is biased below cut-off by a positive potential 32a applied to its cathode through the potentiometer 32. Potentiometer 32 is set according to the number of pulse signals in the applied group so that the bias on tube 13 cannot be overcome by the oscillations appearing across inductance 30 until the oscillatory circuit has received the excitation of the trailing edge of the final pulse in the group. At the instant tube 13 conducts there will be produced across its plate-load resistance 31 a negative voltage pulse which is representative of the circuit output as taken from terminal 36.

To illustrate more precisely the action of the circuit thus far described, reference is to be had to the waveforms shown in Fig. 2. Waveform $a$ is representative of a group of two input pulses applied to the input terminal A of the amplifier 10. The time duration of each of these pulses is equal to one-half of the natural period of the oscillatory circuit 29, 30, and they are spaced in time by an amount equal to their duration. At the leading edge of the first pulse tube 10 is driven to heavy conduction, thereby producing an abrupt negative voltage pulse at its plate. At this instant inductance 30 appears as an exceedingly high impedance to the high frequency components of the applied pulse so that the entire voltage drop across resistance 22 will appear across the inductance 30 as indicated at point $p$ in waveform $b$. The oscillatory circuit is thus shocked into oscillation. One-half cycle later the trailing edge of the first pulse returns the plate of tube 10 to substantially the plate-supply potential to reinforce the initial oscillation as indicated at point $o$ in waveform $b$. One-half cycle later the second positive pulse arrives to further increase the amplitude of the oscillations. In this way the amplitude of the oscillation which exists at a time coincident with the trailing edge of the second pulse is sufficient to overcome the bias on tube 13. At this instant there is produced at the plate of tube 13 the negative voltage pulse shown by waveform $c$. As aforementioned, optimum performance can be obtained when the oscillatory circuit is maintained at a high "Q." With this arrangement, however, the oscillations will persist for a considerable period of time, depending on the "Q" of the circuit, after the arrival of the last pulse in the group. This effect may become troublesome if the interval of time between two successive pulse groups is short; that is, a subsequent pulse group may arrive to find the oscillatory circuit already in a state of oscillation, with the result that the oscillations produced by the subsequent pulse group may either reinforce or oppose those already present, whereby a false or no output at all will appear at the output terminal 36. To avoid this action a damping tube 12 is connected in shunt with inductance 30 of the oscillatory circuit. The action of this damping tube is controlled from the output of tube 13 operating through a multivibrator comprising tubes 15 and 16. The damping tube 12 must be possessed with a low resistance at low plate voltage. For purposes of illustration this tube is exemplified as of the pentagrid type, such as a 6SA7, having all of its grids except the first control grid 40 connected to its plate. In the multivibrator circuit the grid of tube 15 is returned to the positive supply potential through a variable resistance 39. The grid of tube 16 is returned to a source of negative potential through resistance 44 and is also connected to the first control grid 40 of the damping tube 12. As thus arranged, the multivibrator will have one quiescent state in which tube 15 is normally conducting and tube 16 is non-conducting. During this time the damping tube 12 is also non-conducting and will therefore appear as a high impedance in shunt with the inductance 30 of the oscillatory circuit. When the oscillations in the resonant circuit reach a magnitude sufficient to overcome the bias on tube 13, the negative pulse from the plate of that tube is applied to the control grid of tube 15. This pulse renders tube 15 non-conducting and thereby forms at its plate a positive voltage pulse which is applied through capacitance 43 and resistance 41 to the grid of tube 16 to render the latter conducting. At this same instant the damping tube 12 is also rendered conducting to appear as a low resistance in shunt with inductance 30. This action has the effect of inserting additional losses into the oscillatory circuit to cause increased dissipation of energy and critical damping of the oscillations. After a certain interval of time determined principally by the time-constant circuit comprising resistance 39 and capacitance 42, tube 15 returns to conduction rendering tube 16 non-conducting. At this instant tube 12 is also rendered non-conducting and again appears as a high impedance in shunt with the inductance 30. The maximum time interval for which tube 12 is held conducting is adjustable by the variable resistance 39 in the multivibrator circuit. This time interval should not exceed the minimum time interval between successive pulse groups.

As aforementioned, an output from the system is obtainable from the plate of tube 13. In this case, however, the output pulse is of a limited width. If a pulse of greater width is desirable, the output can be taken from either plate of the multivibrator.

It is to be understood that the single embodiment shown and described is taken for the purposes of illustration, and many modifications are possible therein without departing from the spirit of the invention. For example, if it is desired that the system be made to respond to negative pulse signals rather than positive, then it is only necessary to bias tube 10 to a strongly conducting condition. Furthermore the damping tube 12 may be replaced by a gas-filled tube or the multivibrator by an suitable self-returning pulse generator; therefore this invention is not to be limited except insofar as is necessitated by the prior art and the scope of the appended claims.

The invention described herein may be manufactured and used by or for the Government of the United States of America for governmental purposes without the payment of any royalties thereon or therefor.

What is claimed is:

1. In a pulse transmission system a method of pulse width and space discrimination, which comprises, causing the leading edge of each input pulse to start in one phase a train of damped oscillations, causing the trailing edge of each input pulse to start, in an opposite phase, another train of damped oscillations, subjecting to amplification a portion of the resulting oscillations, said portion being that part of the oscillations that exceeds a predetermined voltage level, said voltage level being of a value which may only be exceeded when the oscillations started by the leading and trailing edges of a selected number of input pulses reinforce one another, and then, in response to said last-named operation, abruptly subjecting the remaining portion of said oscillation to critical damping.

2. In a pulse transmission system, a means for obtaining pulse width and space discrimination, comprising a lightly damped oscillatory circuit, means responsive to a succession of input pulses for shock exciting said oscillatory circuit into damped oscillations at both the leading and trailing edges of said input pulses, said oscillations starting in one phase at the leading edge of said input pulses and in the opposite phase at the trailing edge of said input pulses, means for amplifying a portion of the resulting oscillations, said portion being that part of the oscillations that exceeds a predetermined voltage level, said voltage level being of a value which may only be exceeded when the oscillations started by the leading and trailing edges of a selected number of input pulses reinforce one another, and means coupled to said oscillatory circuit and responsive to an output from said last-named means for automatically injecting additional losses into said oscillatory circuit.

3. In a pulse transmission system, a means for obtaining pulse width and space discrimination, comprising a lightly damped oscillatory circuit, consisting of a series connection of inductance and capacitance, means responsive to a succession of input pulses for shock exciting said oscillatory circuit into damped oscillations at both the leading and trailing edges of said input pulses, said oscillations starting in one phase at the leading edge of said input pulses and in the opposite phase at the trailing edge of said input pulses, means for amplifying a portion of the resulting oscillations, said portion being that part of the oscillations that exceeds a predetermined voltage level, said voltage level being of a value which may only be exceeded when the oscillations started by the leading and trailing edges of a selected number of input pulses reinforce one another, and means coupled to said oscillatory circuit and responsive to an output from said last-named means for automatically injecting additional losses into said oscillatory circuit.

4. In a pulse transmission system, a means for obtaining pulse width and space discrimination, comprising a lightly damped oscillatory circuit, means responsive to a succession of input pulses for shock exciting said oscillatory circuit into damped oscillations at both the leading and trailing edges of said input pulses, said oscillations starting in one phase at the leading edge of said input pulses and in the opposite phase at the trailing edge of said input pulses, means for amplifying a portion of the resulting oscillations, said portion being that part of the oscillations that exceeds a predetermined voltage level, said voltage level being of a value which may only be exceeded when the oscillations started by the leading and trailing edges of a selected number of input pulses reinforce one another, vacuum tube means coupled to said oscillatory circuit and responsive to an output from said last-named means for automatically injecting additional losses into said oscillatory circuit.

5. In a pulse transmission system, a means for obtaining pulse width and space discrimination, comprising a lightly damped oscillatory circuit, means responsive to a succession of input pulses for shock exciting said oscillatory circuit into damped oscillations at both the leading and trailing edges of said input pulses, said oscillations starting in one phase at the leading edge of said input pulses and in the opposite phase at the trailing edge of said input pulses, means for amplifying a portion of the resulting oscillations, said portion being that part of the oscillations that exceeds a predetermined voltage level, said voltage level being of a value which may only be exceeded when the oscillations started by the leading and trailing edges of each of said input pulses reinforce one another, a pulse generator, said pulse generator operating in response to an output from said last-named means, and vacuum tube means connected in shunt with one of the elements in said oscillatory circuit and arranged to be driven into conduction in response to the operation by said pulse generator.

6. In a pulse transmission system, a means for obtaining pulse width and space discrimination, comprising a lightly dampened oscillatory circuit, means responsive to a succession of input pulses for shock exciting said oscillatory circuit into damped oscillations at both the leading and trailing edges of said input pulses, said oscillations starting in one phase at the leading edge of said input pulses and in the opposite phase at the trailing edge of said input pulses, means for amplifying a portion of the resulting oscillations, said portion being that part of the oscillations that exceeds a predetermined voltage level, said voltage level being of a value which may only be exceeded when the oscillations started by the leading and trailing edges of a selected number of input pulses reinforce one another, and damping means coupled to said oscillatory circuit responsive to an output from said last-named means for automatically injecting additional losses into said oscillatory circuit for a selected duration of time.

CONRAD H. HOEPPNER.

REFERENCES CITED

The following references are of record in the file of this patent:

UNITED STATES PATENTS

| Number | Name | Date |
|---|---|---|
| 2,063,025 | Blumlein | Dec. 6, 1936 |
| 2,153,202 | Nichols | Apr. 4, 1939 |
| 2,181,309 | Andrieu | Nov. 28, 1939 |
| 2,421,025 | Grieg | May 27, 1947 |
| 2,440,278 | Labin et al. | Apr. 27, 1948 |